PIN REGISTER APPARATUS

Filed Feb. 23, 1968 2 Sheets-Sheet 1

INVENTORS
RICHARD W. HILL
WILLIAM L. GRANT
BY
Heyman Jackman
ATTORNEY

Feb. 3, 1970 R. W. HILL ET AL 3,492,900

PIN REGISTER APPARATUS

Filed Feb. 23, 1968 2 Sheets-Sheet 2

INVENTORS
RICHARD W. HILL
WILLIAM L. GRANT
BY
Seymour Jackman
ATTORNEY

United States Patent Office 3,492,900
Patented Feb. 3, 1970

3,492,900
PIN REGISTER APPARATUS
Richard W. Hill, Pico Rivera, and William L. Grant, Downey, Calif., assignors to Rubber Printing Plates, Inc., Los Angeles, Calif., a corporation of California
Filed Feb. 23, 1968, Ser. No. 707,889
Int. Cl. B26d *7/02*
U.S. Cl. 83—464 7 Claims

ABSTRACT OF THE DISCLOSURE

Apparatus for accurately punching locating holes in the ends of a rubber printing plate so the same can then be provided with holes that will fit on a printing roller which is provided with mounting or attaching pins that fit into the latter holes. The invenion is particularly useful in multi-color printing as the plates of the several colors are so accurately mounted on the respective rollers as to obtain true registry of the different colors being printed by said printing plates. The apparatus includes means to optically locate each end of the plate by means of target marks on the ends of the plate, means to clamp said plates on the surface of a table, and means to then punch one or more holes in the plate in predetermined relation to said target marks. Since all of the target marks are identically located on the several plates, the latter, when used to provide the plates with holes that are engaged with the pins on the printing rollers, will be in accurate printing register.

Background of the invention

As indicated above, the field of the invention is that of multi-color printing, and especially such printing that is carried out by rubber plates or plates of comparable plastic material, and whch are wrapped around rollers to become printing rollers.

Summary of the invention

The present pin register apparatus comprises, generally, a base 5 mounting a table plate 6, an apertured bar 7 mounted on said plate, means 8 for locating the transversely adjusted position of said bar on the table, two telescope mounts 9 and 10 adjustably mounted on the center line 11 of the plate 6, clamping means 12 for clamping a rubber plate 13 in position on the plate 6 as determined by sighting on target marks 14 on the ends of the rubber plate through telescopes 15 and 16, respectively carried by the mounts 9 and 10, and one or more punch units 17 for punching locating holes 18, as guided by selected apertures 19 in the bar 7.

The above generally-described apparatus is issued to punch such holes 18, relative to one of the target marks 14, first in one end of the rubber plate 13 and then, after turning the plate 13 end-for-end, relative to the other target mark 14.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

Brief description of the drawing

In the drawing, like reference characters designate similar parts in the several views.

Description of the preferred embodiment

Figure 1:
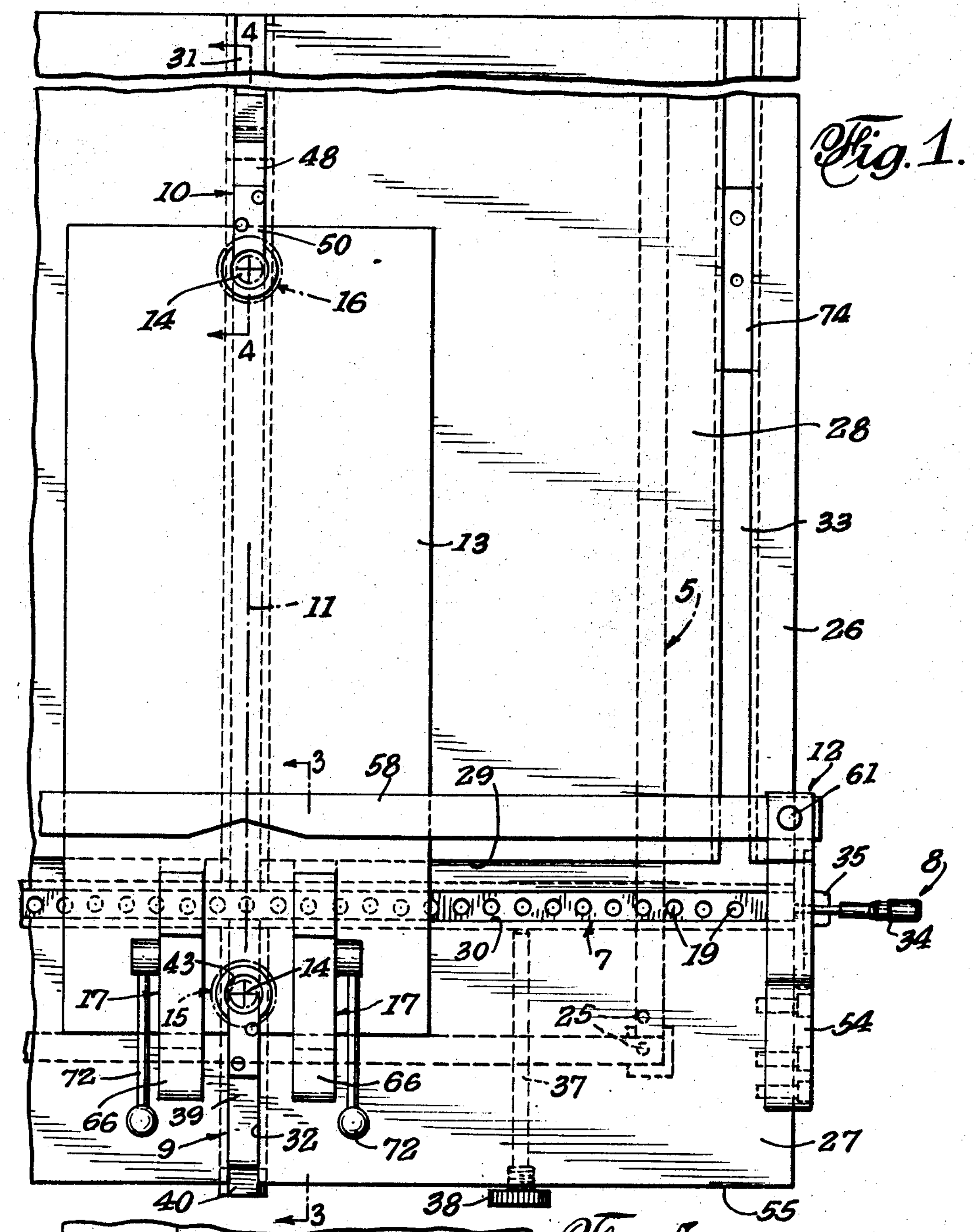
FIG. 1 is partly broken plan view of pin register apparatus according to the present invention.
Figure 5:
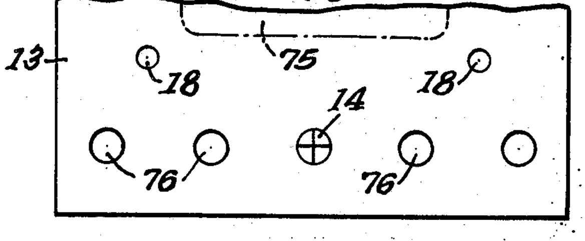
FIG. 5 is a plan view of one end of a rubber printing plate showing the same provided with pin-engaging holes, as provided by the present apparatus.
Figures 2, 3, 4:
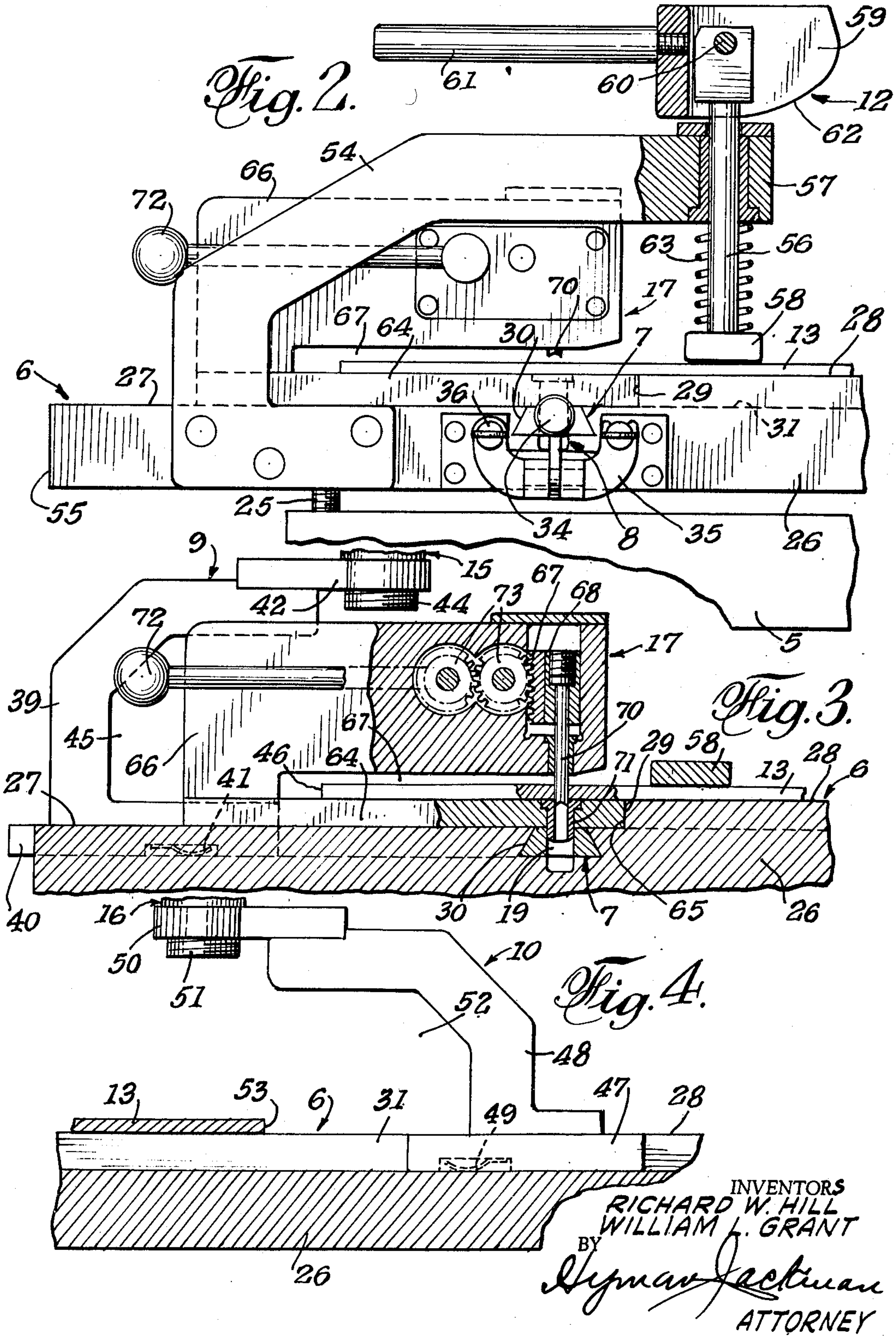
FIG. 2 is an enlarged side view thereof as seen from the right of FIG. 1.
FIGS. 3 and 4 are similarly enlarged and fragmentary sectional views as taken on the respective lines 3—3 and 4—4 of FIG. 1.

While not shown in detail, the base 5 is mounted on legs, and has a rectangular form in plan, as indicated in FIG. 1, the same, by means of suitable jack and levelling screws 25 at each corner, supporting the table plate 6, as indicated in FIG. 2.

The table plate 6 preferably comprises a metal slab 26 having a top face 27 that extends along the front edge thereof and a more elevated face 28 extending over the remainder of the slab, a transverse shoulder 29 being defined at the forward edge of face 28. A transverse undercut groove 30 is provided in the slab face 27, the same extending from side to side of the slab. An undercut longitudinal groove 31 is provided in the slab face 28 along the center line 11, and a similarly forwardly extending and aligned groove 32 is provided in the face 27. Also, if desired, similar longitudinal grooves 33, coextensive with the groove 31, may be provided adjacent each side edge of the slab 26.

The apertured bar 7 is formed to fit the groove 30 and to be slidingly adjusted so selected apertures 19 may be located, as desired, in relation to the center line 11.

The means 8 comprise a micrometer 34 that is carried on an arm 35 swingable on a pivot 36 to an out-of-the-way position so the same clears a path for insertion of the bar 7 into the groove 30. Adjustment of said micrometer, by rotation of its barrel, adjusts the longitudinal position of the bar 7 so a selected aperture or apertures 19 thereof have a predetermined lateral relationship to the center line 11 and, therefore, to a target mark 14 of a plate 13 operatively positioned on the table plate 6. Said adjustment is locked, as by a lock screw 37 provided with a knob 38 accessible from the front of the table.

The telescope mount 9 (FIG. 3) is shown as comprising a bracket 39 with a dovetail base 40 that has a sliding fit in the groove 32 and may be located and frictionally retained in set position by a spring 41 engaging the bottom of said groove. A scope-mounting plate 42 comprises an extension of said bracket 39, the same having a threaded hole 43 that receives a threaded mounting extension 44 of the scope. Said plate 42 is spaced above the base 40 and the bracket 39 is formed to have a rearwardly directed area 45 into which the forward edge 46 of a plate 13 is adapted to be received.

The telescope mount 10 (FIG. 4) is somewhat similar, having a dovetail base 47 that slidingly fits the groove 31, a bracket 48 carried by said base, a spring 49 similar to and for the same purpose as spring 41, and a plate 50 for connection with a threaded extension 51 of the scope 16. The bracket 48 is reversed with relation to the bracket 39 and has a forwardly directed area 52 receptive of the rearward edge 53 of the plate 13.

The clamping means 12 is shown as a bracket 54 affixed to each side of the table plate 6 adjacent the front edge 55, a vertical rod 56 guided in a rearwardly directed arm 57 on each said bracket 54, a clamp bar 58 connected by its ends to said rods 56, a bifurcated cam 59 connected by a pivot 60 to the upper end of each rod 56, and a handle 61 on each said cam to rotate the same on its pivot so the cam edges 62, by operative engagement with the upper faces of the bracket arms 57, cause rods 56 to be raised and released for lowering and, accordingly, to raise and lower the clamp bar 58. Springs 63 around said rods between the bracket arms 57 and the ends of bar 58 bias the latter to clamping engagement with a rubber plate 13 when the cams 59, by means of their handles 61, are moved to released position. In practice, the middle portion of bar 58, i.e., the portion at the center line 11, is bowed to be low so it will flex at the ends to cause firm clamping of the plate 13 against the top face of the slab 26.

Each punch unit 17, best shown in FIGS. 2 and 3, comprises a base plate 64 that is slidably movable over the face 27 of the front portion of the table plate 6 and has a rearwardly directed edge 65 that, when abutted against the shoulder 29 of said plate 6, locates the unit in a front-to-back position on said plate.

Each said unit 17 is provided with a body 66 that is mounted on the forward end of a base plate 64, a rearwardly directed slot 67 being defined for accommodating the forward end of the plate 13. A block 68, having rack teeth 69, is guided for vertical movement in the rearward end of the body, a punch rod 70 extending downwardly from said block. A bushing 71 in the plate 64 is aligned with and receives the punching end of rod 70. The bushing has a lower extension which fits any aperture 19 with which it is aligned. It will be clear that the center line of rod 70 and the bushing 71 have the same spacing from the edge 65 of the base plate 64 as does the line of apertures 19 in the bar 7 from the shoulder 29.

Rod 70 may be retracted, as in FIG. 2, or projected to punch a locating hole 18 in the plate 13 when laterally aligned with a selected aperture 19 by means of the bushing projection. To this end, a handle 72 may be manipulated to cause lowering and raising of the punch rod 70, gears 73 constituting a drive between said handle and said rod to effect such movement.

The present apparatus may be provided with side locators 74, two operable in each groove 33.

Operation

As above indicated, the plates 13 may vary both in length and in width according to the size of the color area 75 and the length and diametral size of the printing rollers on which they are to be removably attached by pins provided on said rollers.

Before a plate 13 is placed on the table plate 6, the bar 7 is adjusted transversely by means of the micrometer 34, to bring a selected aperture or apertures 19 in said bar into predetermined relationship to the center line 11 of said table plate. This relationship is determined by the location of the mounting pins on the printing rollers. Punch units 17, by means of their projecting bushings 71, are located and connected by said bushings to two selected apertures on either side of the center line 11 in the mentioned predetermined relation. The target marks 14 at each end of the plate 13 are provided on said plate so that when the two telescopes 15 and 16 are sighted on said marks, the position of the plate 13 on the table is squared up. The clamp bar 58 is then released to clamp the plate 13 in its squared position. Now the punch units 17 are operated to punch the locating holes 18 in the forward end of the plate 13.

The clamp is then released, the plate 13 is turned end-for-end, and the target marks 14 on said plate are again used to square up plate 13, as before. After again clamping plate 13, the holes 18 on the end of said plate, now beneath the punch units, are punched in the above-described manner.

It will be clear that, since the holes 18 at either end of plate 13 are in an exact positional relationship to the target marks 14, the same may be used to locate said plate, each end at a time, in a jig with locating dowels for these holes. Thus, as located by means of the holes 18, pin-engaging holes 76 may be drilled, either in each plate 13 separately, or in a group or stack of two, three, four or more, held located by the jig dowels.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus describd the invention, what is claimed and desired to be secured by Letters Patent is:

1. Pin register apparatus comprising:
(a) a table plate having a flat surface to adjustably support a rubber printing plate provided with a target mark on each end thereof,
(b) a transverse bar having longitudinally arranged apertures therein guided on said table plate and transversely adjustable thereon,
(c) means to adjust said bar to bring a selected aperture thereof into a predetermined relationship to the longitudinal center of the table plate,
(d) means to lock said bar in adjusted position,
(e) two longitudinally spaced telescope units longitudinally adjustable on the longitudinal center of said table plate, one forward and the other rearward of the apertured bar, the telescopes of said units being adapted individually to be sighted on the target marks of the rubber plate for achieving a squared position of the latter on the table plate,
(f) means to clamp the rubber plate in squared condition on the table plate,
(g) a locating shoulder on said table plate, and
(h) at least one punch unit, provided with a bushing having an extension to fit the mentioned selected aperture in the transverse bar to locate said unit in register with said aperture,
(i) the punch of said unit being guided in said bushing.

2. Pin register apparatus according to claim 1 in which
(a) the table plate is provided with guide means to align the two telescope units on the center of said table plate, and
(b) each said telescope unit having friction means to retain the same in adjusted sighting position on the target marks.

3. Pin register apparatus according to claim 1 in which the bar-adjusting means comprises a micrometer mounted on a bracket secured to a side edge of the table plate, the usual adjustable spindle of the micrometer having end engagement with the bar to locate the bar according to the adjustment of said spindle.

4. Pin register apparatus according to claim 1 in which the rubber plate-clamping means comprises a transverse bar spanning across the table plate, and a clamp provided on each side of the table and engaged with the opposite ends of the mentioned bar to press the same into clamping engagement with the table plate.

5. Pin register apparatus according to claim 4 in which the clamping bar is provided intermediate its ends with a downward bowed portion that makes clamping contact with a rubber printing plate, said bowed portion being straightened as the clamps are operated to press the bar ends into the mentioned pressing engagement with the table plate.

6. A pin register apparatus according to claim 1 in which each punch unit comprises:

(a) a body having a rearwardly open bifurcation into which the forward end of a rubber printing plate is adapted to extend, (b) the portion of said body defining the bottom of said bifurcation being provided with the mentioned bushing, and (c) the upper portion of said body mounting the punch that is operatively associated with the bushing.

7. A pin register apparatus according to claim 6, said latter portion of the body of the punch unit being provided with manual punch-projecting and -retracting means.

References Cited

UNITED STATES PATENTS

| | | | |
|---|---|---|---|
| 1,789,851 | 1/1931 | Vandercook et al. | 83—521 |
| 3,175,298 | 3/1965 | Dengle | 33—184.5 |
| 3,368,439 | 2/1968 | Bungay | 83—521 X |

WILLIAM S. LAWSON, Primary Examiner

U.S. Cl. X.R.

33—184.5; 83—467, 521